United States Patent [19]
Ringstad et al.

[11] 3,921,070
[45] Nov. 18, 1975

[54] ELECTRICAL POWER MONITOR

[75] Inventors: Ralph H. Ringstad, Whippany; James M. Daley, Bayonne, both of N.J.

[73] Assignee: Automatic Switch Company, Florham Park, N.J.

[22] Filed: Sept. 1, 1972

[21] Appl. No.: 285,776

[52] U.S. Cl. .................. 324/142; 328/115; 323/102
[51] Int. Cl.² ......................................... G01R 21/06
[58] Field of Search ..... 307/252 F; 324/140 R, 142; 328/115; 340/248 A; 323/101, 102, 108

[56] References Cited
UNITED STATES PATENTS

| | | | |
|---|---|---|---|
| 2,870,406 | 1/1959 | Smith | 324/140 R |
| 2,919,408 | 12/1959 | Brown | 324/142 |
| 3,128,450 | 4/1964 | Scott et al. | 340/248 A |
| 3,218,554 | 11/1965 | Corson | 324/142 |
| 3,267,375 | 8/1966 | Olsen | 340/248 A |
| 3,454,787 | 7/1969 | Gelernter | 340/248 A |
| 3,684,919 | 8/1972 | Cramer | 307/252 F |

Primary Examiner—A. D. Pellinen
Attorney, Agent, or Firm—Alan H. Levine

[57] ABSTRACT

In a monitor for determining the real electrical power being delivered by a 3-phase source to a load, each phase voltage and a voltage which is proportional to and in phase with the corresponding line current are coupled to separate balanced detectors. Each detector provides a D.C. voltage which is proportional to the real power being delivered by its corresponding phase. The D.C. voltages from the balanced detectors are connected in series and the resulting sum voltage is coupled to a plurality of voltage comparators. Each voltage comparator provides a signal when the sum voltage exceeds a predetermined magnitude and each of the voltage comparators is set to respond to a different sum voltage magnitude. Since the sum voltage is proportional to the real power being delivered by the source, within the range of voltage magnitudes set, the output signals of the voltage comparators provide a measure of the power being delivered by the 3-phase source. A binary output means, such as a relay, is controlled by each comparator.

10 Claims, 3 Drawing Figures

ELECTRICAL POWER MONITOR

The subject invention relates to A.C. power monitors.

The successful operation of an electrical power plant depends upon having a knowledge of the electrical power flowing past predetermined points in its power distribution system, and using the knowledge to properly distribute the available electrical power. Generally, the measurement of power flowing through the predetermined points, and the control of the power distribution are accomplished with automatic equipment. In one known way, wattmeters are connected to predetermined points in the power distribution system, and the wattmeter movement is sensed and processed to provide signals which are suitable for controlling the distribution of the available electrical power. However, the wattmeters and their corresponding sensors are complex electromechanical devices which are subject to wear and tear. Further, because of their complex nature, adjustments of the power levels to which the sensors are responsive are difficult, time consuming, and expensive.

Some power sensing systems have been designed that measure the amount of heat generated in a reference resistor. Here, the component of current that is in phase with the system voltage and is proportional in magnitude to system current is passed through a reference resistor. The heat generated by this resistor is in turn proportional to system power. This arrangement is acceptable and has the advantage of no moving parts. Unfortunately, it is expensive and it is slow. Time must be allowed for the resistive element to come up to temperature and stabilize at that temperature before a true reading of system power is achieved.

Accordingly, it is an object of the present invention to provide a power monitor having few, or no, moving parts and rapid response. Preferably, the monitor is an all solid state device, except perhaps for its output relay, which could if desired also be a solid state unit.

It is another object of the present invention to provide a power monitor whose range of operation is readily adjustable.

It is still another object of the present invention to provide a power monitor which provides a measure of the power in binary form.

The above mentioned objects are met, according to the invention, by a monitor for determining the real electrical power being delivered by an A.C. source to a load, comprising:

a. means for providing a D.C. signal which is proportional to the power delivered by the A.C. source to the load;

b. means for providing at least one reference voltage; and c. means for comparing the D.C. signal with said reference voltage, or each of them, if there are more than one, and for providing at least one binary signal, each of the binary signals being related to one of the reference voltages and providing information with regard to whether the magnitude of the D.C. signal is less than or greater than its corresponding reference voltage, thereby providing a measure of the A.C. power being delivered to the load.

Additional objects and features of the subject invention will become apparent by reference to the following description in conjunction with the accompanying drawings, in which.

Figure 1:
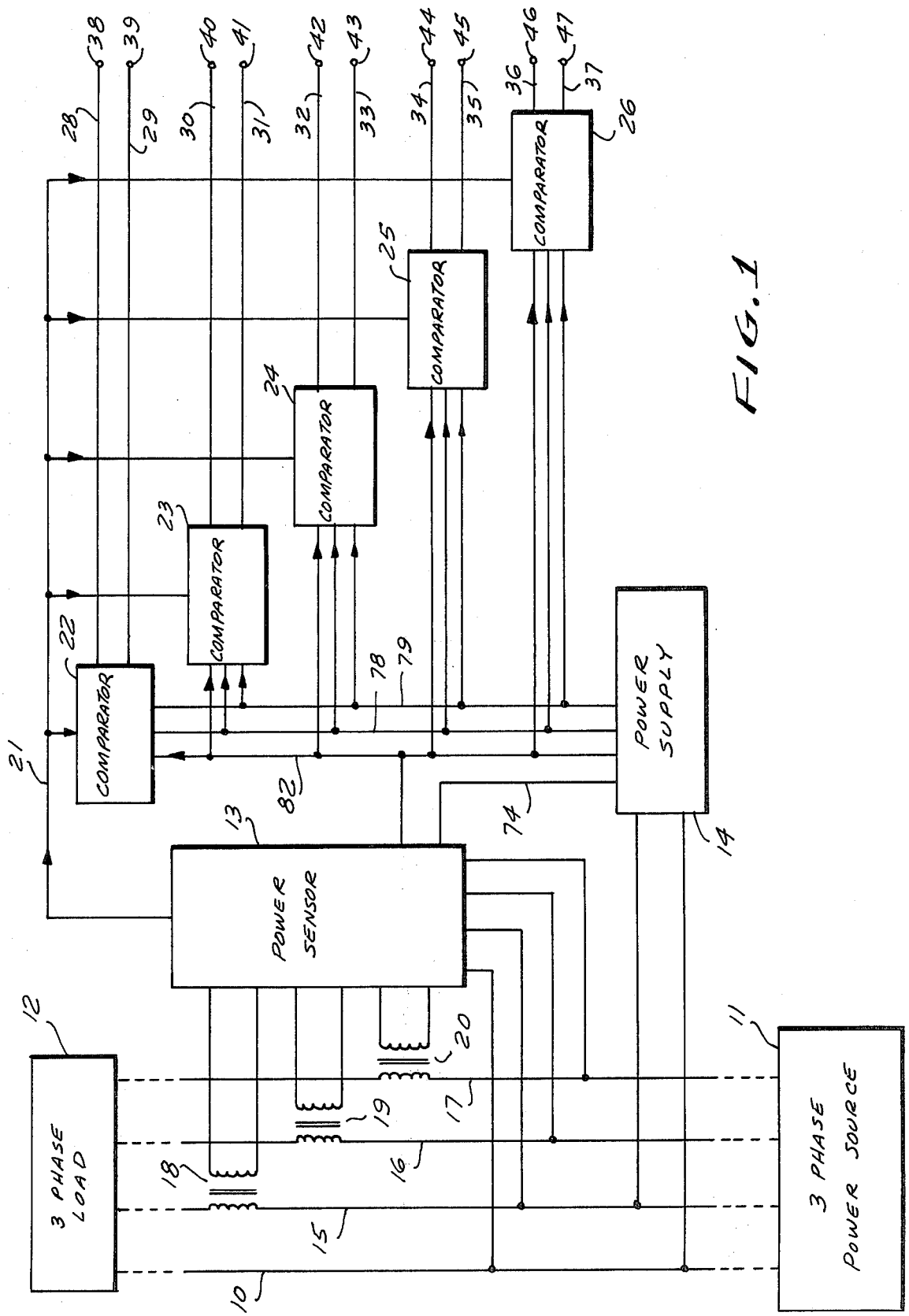
FIG. 1 is a schematic block diagram of an electrical power monitor, according to the invention.

A schematic diagram of an electrical power monitor, according to the invention, for a 3-phase Y-connected power distribution system, is shown in FIG. 1. In general, the neutral line 10 of the power source 11 is connected to a three-phase load 12, a power sensor 13, and a power supply 14. The phase A line 15 of the power source 11 is connected to the power sensor 13, the power supply 14, and via the primary of a current transformer 18, to the load 12. The phase B line 16 of the power source 11 is connected to the power sensor 13 and, via the primary of a current transformer 19, to the load 12. The phase C line 17 of the power source 11 is connected to the power sensor 13 and, via the primary of a current transformer 20, to the load 12. The secondary windings of each of the current transformers 18–20 are connected to the power sensor 13. Thus, the phase A, B, and C power source voltages, and currents which are proportional to the phase A, B, and C currents, are connected to the power sensor 13, and the power supply 14 is connected to the phase A voltage.

As more fully described below, the power sensor 13 provides, via line 21, to each of a plurality of voltage comparators 22–26, a D.C. voltage which is proportional to the real power being supplied by the 3-phase power source 11 to the load 12. In addition, the power supply 14 provides, for example, D.C. voltages of 28V, 24V, and 3.9V via lines 82, 79, 78 respectively, to each of the comparators 22-26, and D.C. voltages of 28V and 5.1V via lines 82 and 74, respectively to the power sensor 13. As more fully discussed below, the 24V and 3.9V lines are used in comparators 22–26 to provide a reference voltage, the 28V line is used to supply power to solid state circuitry, and the nominal 5.1 voltage is used to provide a stable minimum voltage on line 74.

Comparator 22 includes a binary indicator. In this example, the binary indicator is in the form of a pair of relay contacts (not shown), one of which is connected to terminal 38 via line 28 and the other of which is connected to terminal 39 via line 29. Normally, the relay contacts are set to close when the D.C. voltage on line 21 from the power sensor 13 exceeds the reference voltage or comparator 22. Thus, when the D.C. voltage from the power sensor 13 is greater than the reference voltage, terminals 38 and 39 are shorted and when the D.C. voltage from the power sensor is less than the reference voltage the terminals 38 and 39 are open circuited, thereby providing, in binary form, a measure of the power being supplied by the power source to the load 12. Similarly, relay contacts of comparators 23–26 are respectively connected by two pairs of wires 30, 31, 32, 33, 34, 35 and 36, 37, to terminals 40, 41, 42, 43, 44, 45, and 46 and 47, respectively. Consequently, by setting the reference voltages of the comparators 22–26 at different voltages, within a range of voltages, the open or closed circuit conditions of the pairs of terminals 38, 39, 40, 41, 42, 43, 44, 45 and 46, 47 can be used to measure whether the power being delivered by the power source is greater than or less than predetermined levels.

Figure 2:
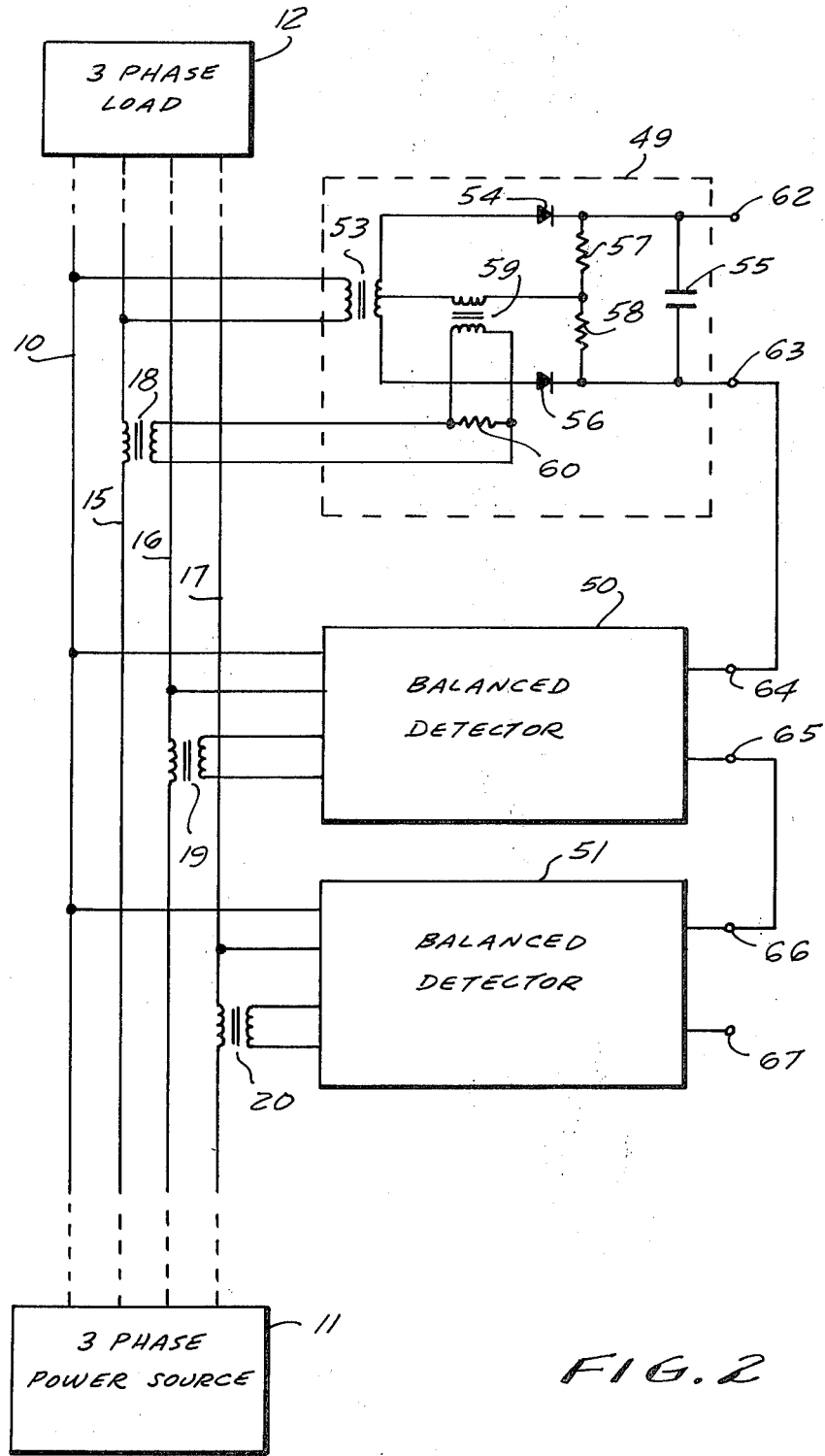
FIG. 2 is a schematic diagraph showing part of the power sensing circuit of the electrical power monitor, and the electrical connections between the power sensing circuit and a 3-phase circuit whose power transfer is to be monitored.

As shown in FIG. 2, the power sensor 13 includes three identical balanced detectors 49–51. The balanced detector 49 includes a transformer 53 whose primary winding is connected at one end to neutral line 10 and at the other end to phase A line 15. Accordingly, the power source 11 provides a phase A voltage to transformer 53. The secondary winding of the transformer 53 is connected at one end to the anode of a diode 54 whose cathode is connected to one end of a capacitor 55. The other end of the capacitor 55 is connected to the cathode of a diode 56 whose anode is connected to the other end of the secondary winding of transformer 53. Thus, the secondary winding of transformer 53 is connected in series with two diodes 54 and 56 and a capacitor 55. The cathode of diode 54 is connected to one end of a resistor 57, and the other end of resistor 57 is connected, via a resistor 58 of identical value, to the cathode of diode 56. Therefore, it may be seen that the series connected resistors 57 and 58 are in parallel with the capacitor 55. The connection between the resistors 57 and 58 is also connected via the secondary winding of a transformer 59 to a center tap on the secondary winding of the transformer 53. The primary winding of the transformer 59 is connected in parallel with a resistor 60, and the secondary winding of the current transformer 18.

Thus, the voltage across the primary of the transformer 59 is proportional to and in phase with the phase A current. As a result, if the phase A voltage is kept constant, a D.C. voltage will be developed across capacitor 55 which is proportional to the product of the current flowing on line 15 and the cosine of the phase difference between the phase A voltage and current. Since the real power being delivered by phase A is proportional to the product of the line voltage, the line current and the cosine of their phase difference, the D.C. voltage on capacitor 55 is proportional to the power being delivered by the source 11 via phase A.

Terminal 62 is connected to one end of capacitor 55 and terminal 63 is connected to the other end of capacitor 55, thereby providing access to the voltage across capacitor 55. Similarly, the balanced detector 50 is coupled to phase B line 16 of the power source 11 and provides a D.C. voltage at terminals 64 and 65 which is proportional to the A.C. power being delivered via phase B. In a like manner, the balanced detector 51 is coupled to phase C line 17 of the power source 11 and provides a D.C. voltage on terminals 66 and 67 which is proportional to the A.C. power being delivered via phase C. Terminal 63 is connected to terminal 64 and terminal 65 is connected to terminal 66. Therefore, the voltage across terminals 62 and 67 is equal to the sum of the D.C. voltages provided by the balanced detectors 49–51 and is proportional to the total A.C. power being delivered by the three-phase power source 11.

Figure 3:
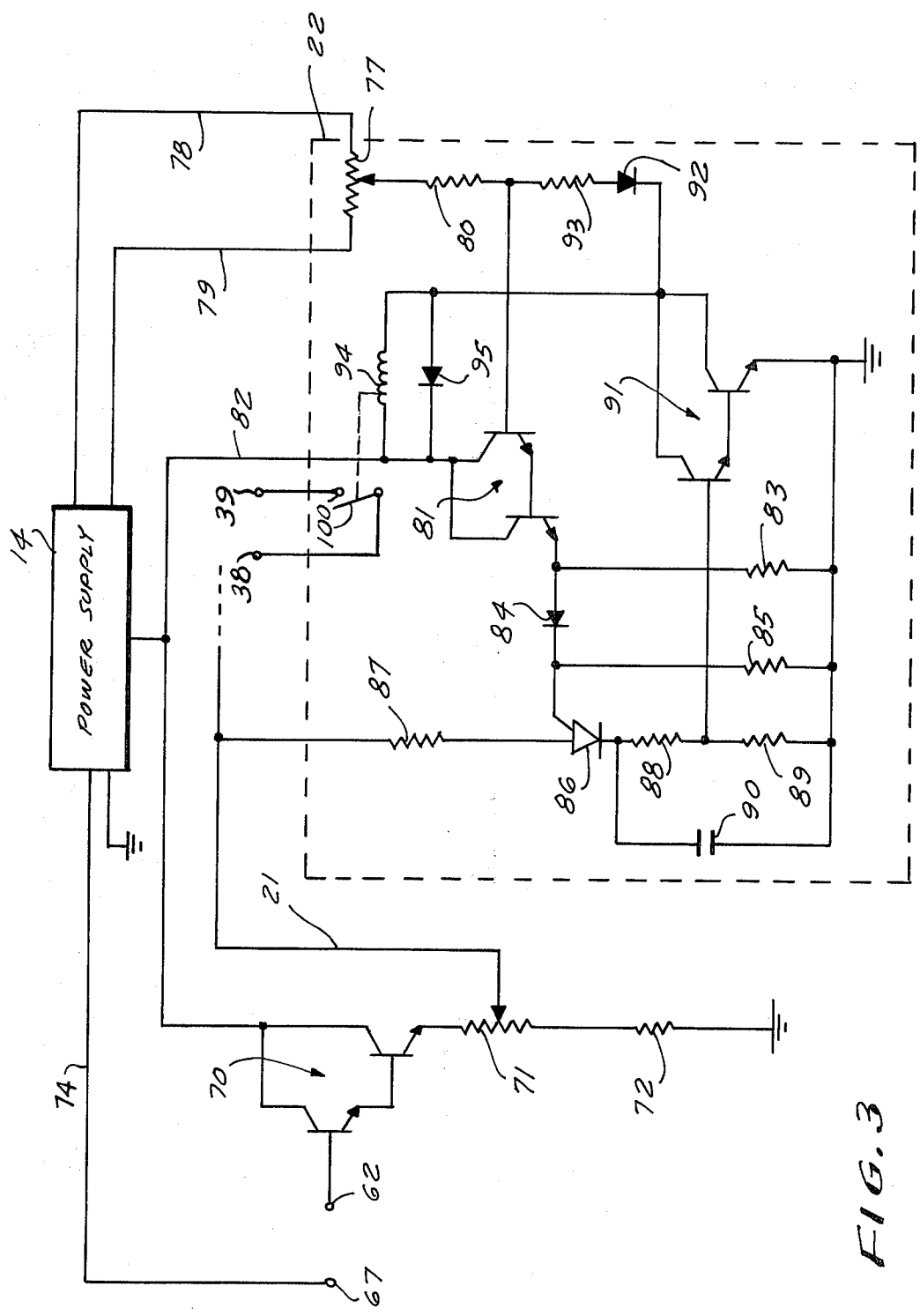
FIG. 3 is a schematic diagram of part of the power sensing circuit and one of the comparators of the electrical power monitor.

Referring to FIG. 3, the power source 13 also includes a Darlington transistor network 70 having the usual base, collector, and emitter leads. The emitter lead is connected via a potentiometer 71 to a grounded resistor 72, the collector lead is connected via line 82 to the power supply 14, and the base lead is connected to terminal 62. As previously mentioned, the grounded power supply 14 nominally supplies, via line 74, 5.1 volts to terminal 67, thereby causing a minimum voltage to appear across the voltage divider composed of the potentiometer 71 and resistor 72, e.g., when no power is being delivered by the power source 11. To provide a stable minimum voltage, power supply 11 is designed, using techniques well known in the art, so that the 5.1 volts supplied to terminal 67 varies with temperature to compensate for temperature variations of the emitter to base voltage drop of the Darlington network. As a result, the voltage across the potentiometer 71 and resistor 72 remains substantially constant. Referring to FIGS. 1 and 3, the wiper arm of the potentiometer 71 is connected via line 21 to the voltage comparators 22–26. Thus, an adjustable maximum voltage is provided to each of the comparators 22–26. As more fully discussed below, the adjustable maximum voltage is required to establish a maximum operating voltage needed by the comparators to establish the maximum D.C. voltage on line 21 when the power source 11 is supplying its maximum power.

The comparators 22–26 are all identical. Therefore, only comparator 22 will be discussed in detail. Referring to FIG. 3, the comparator 22 includes a potentiometer 77, one end of which is connected to the power supply 14 by line 78 and the other end of which is connected to the power supply 14 by line 79. Lines 78 and 79 supply the 3.9 and 24 volts, respectively, to the potentiometer 77. Thus, the wiper arm of the potentiometer 77 provides a variable reference voltage. The wiper arm of the potentiometer 77 is connected to one end of a resistor 80, and the other end of the resistor 80 is connected to the base of a Darlington transistor network 81. The collector lead of the Darlington transistor network is connected, via line 82, to the positive 28 volts output of the power supply 14, and the emitter lead of the Darlington transistor network 81 is connected via a stabilization resistor 83 to ground. In addition, the emitter lead is connected to the anode of a diode 84 whose cathode is connected to ground, via a stabilization resistor 85, and to the gate of a programmable unijunction transistor 86, hereinafter referred to as PUT. Line 21 is connected, via current limiting resistor 87 to the anode of the PUT 86, and the cathode of the PUT is connected to a grounded capacitor 90 and to one end of a resistor 88. The other end of resistor 88 is connected to a grounded resistor 89 and to the base of a Darlington transistor network 91. The emitter lead of the Darlington transistor network 91 is grounded and its collector is connected to the power supply lead 82 by the coil 94 of a relay having switch contacts 100. In addition, the collector lead of the Darlington transistor network 91 is connected to the anode of a diode 95 whose cathode is connected to line 82, and the cathode of a diode 92 whose anode is connected to one end of resistor 93. The other end of resistor 93 is connected to the base lead of the Darlington transistor network 81.

The comparator 22 functions as follows:

Assuming that when the power source 11 is delivering a predetermined amount of power the D.C. voltage on line 21 is, for example, 10 volts and it is desired to sense when the predetermined power is being delivered, the wiper arm of the potentiometer 77 is set so as to provide a voltage which is equal to 10 volts plus the sum of the voltage drops across diode 84 and the emitter to base leads of the Darlington transistor network 81. Thus, the voltage at the gate of PUT 86 will be equal to 10 volts. With such a voltage on the gate of the PUT the gate-to-anode voltage of the PUT is reversed biased until the power being delivered by the power source 11 exceeds the predetermined level to be measured. However, once the power source 11 delivers power in excess of the predetermined power level, the voltage on line 21 exceeds 10 volts and PUT 86 turns on thereby causing current to flow through the resistor 88 and into the base of the Darlington transistor network 91. As a result, the power supply 14 supplies current via line 82 and the coil 94 to the collector lead of the Darlington transistor network 91, and the relay associated with the coil 94 is activated, thereby causing its contacts (not shown) to close. When the Darlington transistor network 91 is turned on, as described, the voltage at the collector lead drops and, consequently, current flows to the collector lead via resistors 80 and 93 and the diode 92. The flow of current through resistor 80 to the collector lead of the Darlington transistor network 91 causes the voltage being applied to the base of the Darlington transistor network 81 to drop. The drop in voltage at the base of the Darlington transistor network 81 causes the gate voltage of the PUT 86 to drop and a "snap action" results which stabilizes the comparator circuit. In this regard, it should be noted that capacitor 90 serves to suppress ripple voltage inputs to the PUT.

As long as the voltage on line 21 exceeds the gate voltage of the PUT 86, the PUT remains on. However, when the voltage on line 21 drops below the gate voltage, the PUT 86 turns off. As a result, the current which had been flowing into the base of the Darlington transistor network 91 is terminated and the voltage at its collector lead is caused to rise, thereby turning off the flow of current through coil 94 and deenergizing the coil. When the coil 94 is deenergized its corresponding relay is deenergized and its contacts open. When the voltage at the collector lead of the Darlington transistor network 91 rises, the diode 92 is back-biased and current stops flowing into the collector lead via resistor 80. Accordingly, the voltage at the base of the Darlington transistor network 81 rises to its initially set value. Thus, it may be seen that the setting of the wiper arm of the potentiometer 77 determines the power level at which the coil 94 will be energized, and consequently, the power level at which its contacts change their state.

Since the reference voltage of each of the comparators 22–26 may be set to correspond to different and, if desired, incrementally spaced predetermined power levels it may be seen that the open or closed circuit condition of pairs of contacts associated with the relays of the comparators may be used to determine the amount of power being supplied by the three-phase power source 11 to the three-phase load 12. However, although the comparators 22–26 have been designed to energize relays whose contacts may be connected to automatic equipment for controlling the power distributed by an electrical generating plant, it should be recognized that the voltage comparators 22–26 may be used to activate visual or electronic indicators as well.

It is obviously necessary to operate electronic equipment with voltages other than zero. Accordingly, the minimum reference voltage in this example (line 78) was chosen to be 3.9 volts. Therefore, since the minimum voltage on line 21 is nominally 5.1, the monitor is capable of sensing down to the zero power levels. The maximum power which the monitor is capable of detecting may be readily designed into the system by, for example, appropriately selecting the turns ratio of its current sensing transformers. It should be mentioned that all voltages referred to in the above description are illustrative and obviously any desired voltages can be employed.

Furthermore, although the monitor of this invention has been illustrated and described in connection with a three-phase power source, it can also be used with a single phase source, in which case only one balanced detector, e.g., balanced detector 49 (FIG. 2) is required. In addition, although five comparators 22–26 are illustrated in this example more or fewer comparators may be employed to provide more or fewer predetermined detectable levels of power being supplied by power source 11.

Accordingly, it is to be understood that the description herein of a preferred embodiment according to the invention is set forth as an example thereof and is not to be construed or interpreted as a limitation on the claims which follow and define the invention.

What I claim is:

1. A monitor for determining the real electrical power being delivered by an A.C. line to a load, comprising:
   a. means for providing a D.C. signal which is proportional to the product of A.C. line current, the corresponding A.C. line voltage, and the cosine of the phase difference between said line current and line voltage,
   b. means for providing a reference voltage which corresponds to a particular level of power being delivered by the A.C. source, and
   c. means for comparing the D.C. signal with said reference voltage and for providing a binary signal in response thereto, the binary signal indicating whether the magnitude of the D.C. signal is less than or greater than the reference voltage, thereby indicating whether the A.C. power being delivered to the load is less than or greater than said particular power level.

2. A monitor as defined in claim 1 wherein said means for providing a D.C. signal includes a balanced detector.

3. A monitor as defined in claim 1 for use with an A.C. source which supplies polyphase power to the load, wherein said means for providing a D.C. signal includes an individual detector coupled to each phase of the A.C. source, each detector providing a D.C. output signal proportional to the power delivered by its respective phase, and means connecting said D.C. output signals in series to produce said D.C. signal.

4. A monitor as defined in claim 1 wherein the means for providing a reference voltage includes a power supply coupled to the A.C. source.

5. A monitor as defined in claim 1 including a binary output means controlled by said comparing means, the state of said binary output means indicating whether the power being delivered by the source is less or greater than said particular power level.

6. A monitor as defined in claim 5 wherein said binary indicator includes a relay having a pair of contacts, the states of said binary indicator being the open or closed circuits condition of said contacts.

7. A monitor as defined in claim 1 wherein said means for comparing the D.C. signal with said reference voltage includes a comparator comprising:
   a. a binary indicator;
   b. a programmable unijunction transistor having an anode, a cathode, and a gate;
   c. means coupling the gate to the reference voltage;
   d. means coupling the anode to the D.C. signal; and e. means coupling the cathode to the binary indicator, whereby when the magnitude of the D.C. signal exceeds the magnitude of the reference voltage the binary indicator is in one of its states and when the magnitude of the reference voltage exceeds the magnitude of the D.C. signal the binary indicator is in the other of its states.

8. A monitor as defined in claim 7 wherein said means for providing a reference voltage includes means for controlling the magnitude of the D.C. signal required to cause the binary indicator to change its state.

9. A monitor as defined in claim 7 wherein said means coupling the anode to the D.C. signal includes a Darlington transistor network.

10. A monitor as defined in claim 1 including means for providing a plurality of reference voltages each of which corresponds to a different particular level of power being delivered by the A.C. source, and a plurality of comparing means, each of said comparing means comparing said D.C. signal with a different one of said reference voltages.

* * * * *